United States Patent

Miyazaki et al.

[11] Patent Number: 5,802,766
[45] Date of Patent: Sep. 8, 1998

[54] METHOD AND APPARATUS FOR CONTROLLING AUTOMATIC OPENING AND CLOSING OF WINDOW OF DRIVER'S CAB OF WORKING VEHICLE

[75] Inventors: Masamichi Miyazaki, Hirakata; Yoshihiro Nagata, Zyoyo, both of Japan

[73] Assignee: Kabushiki Kaisha Komatsu Seisakusho, Tokyo, Japan

[21] Appl. No.: 586,924

[22] PCT Filed: Jul. 21, 1994

[86] PCT No.: PCT/JP94/01203

§ 371 Date: Jan. 23, 1996

§ 102(e) Date: Jan. 23, 1996

[87] PCT Pub. No.: WO95/03465

PCT Pub. Date: Feb. 2, 1995

[30] Foreign Application Priority Data

Jul. 23, 1993 [JP] Japan ................................ 5-202645

[51] Int. Cl.$^6$ ...................................................... E05F 15/20
[52] U.S. Cl. ................................... 49/29; 49/28; 49/506; 49/360
[58] Field of Search .................. 296/190, 201, 296/147, 146.16; 49/197, 199, 29, 28, 30, 31, 360, 361, 506

[56] References Cited

U.S. PATENT DOCUMENTS

| | | | |
|---|---|---|---|
| 3,992,816 | 11/1976 | Skahill | 49/197 |
| 4,621,223 | 11/1986 | Murakami et al. | 49/28 X |
| 4,634,945 | 1/1987 | Takemura et al. | 49/28 X |
| 4,641,067 | 2/1987 | Iizawa et al. | 49/28 X |
| 5,018,303 | 5/1991 | Koura et al. | 49/360 X |
| 5,203,112 | 4/1993 | Yamagishi et al. | 49/360 X |
| 5,557,887 | 9/1996 | Fellows et al. | 49/360 X |

FOREIGN PATENT DOCUMENTS

| | | |
|---|---|---|
| 61-64981 | 4/1986 | Japan . |
| 63-142179 | 6/1988 | Japan . |
| 4-11184 | 1/1992 | Japan . |
| 4-208632 | 7/1992 | Japan . |
| 4-365619 | 12/1992 | Japan . |
| 5-4516 | 1/1993 | Japan . |
| 6144002 | 5/1994 | Japan ................. 296/146.16 |

*Primary Examiner*—Jerry Redman
*Attorney, Agent, or Firm*—Sidley & Austin

[57] ABSTRACT

A method and apparatus is provided for controlling the automatic opening and closing of a window of the driver's cab of a working vehicle in which the automatic opening and closing operations and locking operation of the window are carried out smoothly by detecting the opening and closing stop positions of the window and the operation stop positions of the locking units without fail and with high safety. In the method and the apparatus for controlling the opening and closing of the window in which the window (14) can be moved vertically between the window frame (16) and the top wall (18) by the driving means (34) for the driving cable (28) and pressed against the window frame (16) by the locking units (29L, 29R) during a window closing operation to shut the window, the terminal position for the downward movement of the window (14) during its closing operation and the terminal position for the upward movement of the window (14) during its opening operation are detected as a load current of the driving means (34) for the driving cable (28) exceeding a predetermined threshold value, whereupon the driving means (34) for the driving cable (28) is stopped. The locking stop positions and locking release positions of the locking units (29L, 29R) are also detected as the load currents of the lock motors (44L, 44R) exceeding a predetermined threshold value, whereupon the lock motors (44L, 44R) are stopped.

20 Claims, 7 Drawing Sheets

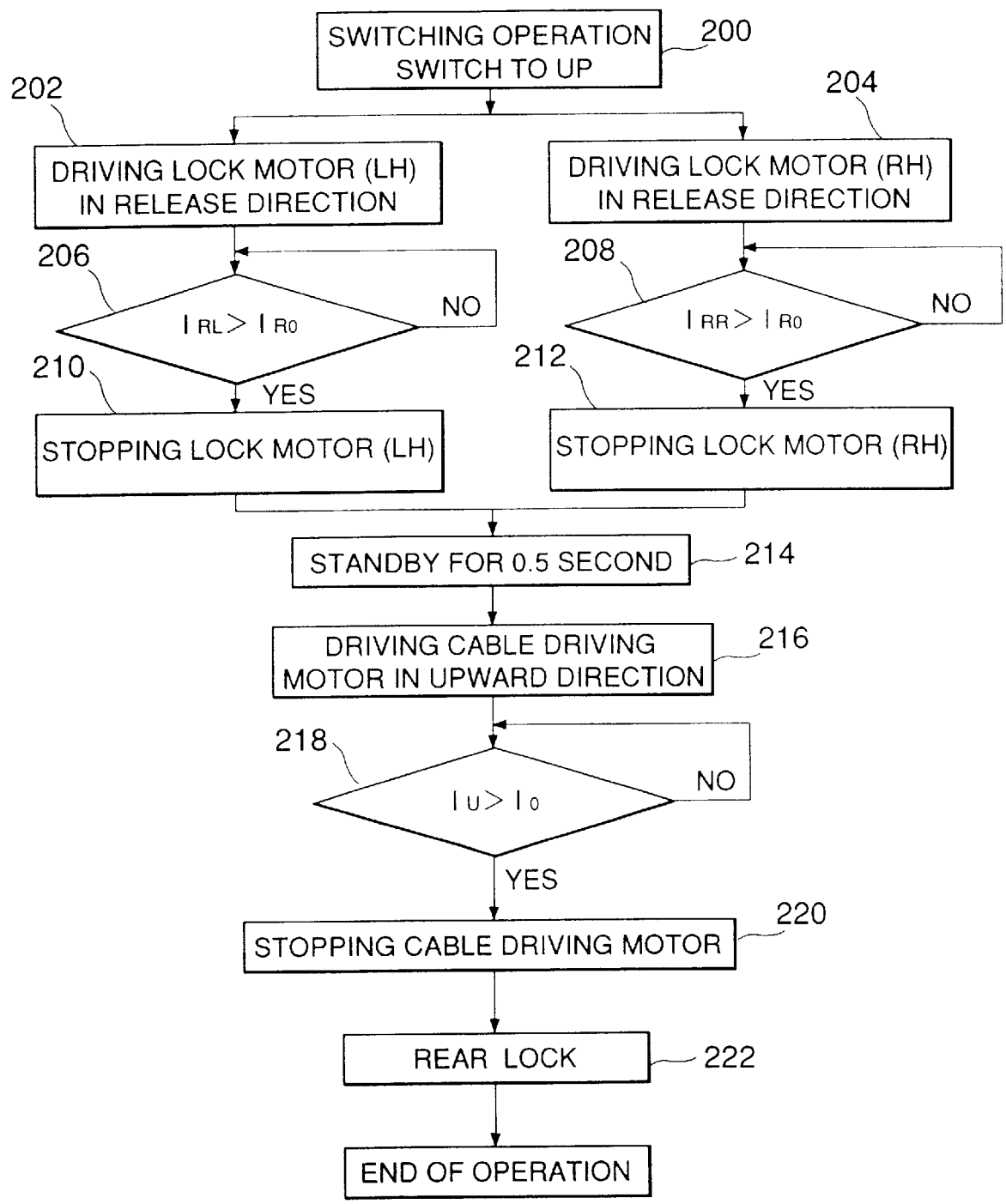
F I G. 3

METHOD AND APPARATUS FOR CONTROLLING AUTOMATIC OPENING AND CLOSING OF WINDOW OF DRIVER'S CAB OF WORKING VEHICLE

FIELD OF THE INVENTION

This invention relates to improvements in a method and apparatus for controlling the automatic opening and closing of a window of the driver's cab of a working vehicle, which is suitable for the opening and closing of the front window of the driver's cab of a construction machine such as a hydraulic shovel, crane or the like.

BACKGROUND OF THE INVENTION

In a construction machine such as a hydraulic shovel, crane or the like, the front window can be opened and closed because the glass of the front window (to be referred to as "window" hereinafter) makes it difficult to see objects outside the driver's cab, communication with an assistant worker is necessary, and so on. That is, guide rails, extending from the window frame to the top wall (ceiling) of the driver's cab, are provided so that the window is moved upwardly as it is moved away from the window frame, by pulling it from the window frame toward the driver, and then is moved along the guide rails until it becomes parallel to the top wall. This operation is performed manually by the driver, holding one of the grips provided on the top and bottom of the window.

Since the weight of the window is about 20 kg, it is not easy for the driver to open and close the window. Further, as each guide rail is shaped almost like a turned letter L, it is difficult to move the window smoothly along the bent portion of the guide rail, and the driver must open and close the window in an unnatural posture. Therefore, the inventors of the present invention have proposed an apparatus for automatically opening and closing this type of window (refer to JP(A)4-36519).

In the above apparatus, guide rails for moving the window vertically are provided both on the window frame and on the top wall, rollers which roll along each of the guide rails are provided at the four corners of the window, a driving cable provided with a wire ring is connected to the window, and the window is opened and closed by the drive force of a motor for circulating the driving cable. The opening operation of this window is accomplished as follows. A motor driving switch is first turned on to rotate the motor, and the window is pulled upwardly by the driving cable and stored in the guide rails on the top wall. The closing operation of the window is accomplished as follows. The cable is driven by the reverse rotation of the motor so that the window is moved downwardly along the guide rails on the window frame from the guide rails of the top wall. Particularly, when the window is closed, locking units are used to press the window against the window frame and shut it after the window is moved downwardly to face the window frame. Each of the locking units is structured such that it engages with a locking pin, provided on the window, only at the time of locking so that it does not interfere with the movement of the window during the window opening and closing operations.

In this type of automatic opening and closing mechanism, it is necessary to carry out the detection of the window opening or closing end position properly at the time of opening or closing the window and to surely detect the locking stop position or the locking release position of the locking units at the time of locking or releasing the window.

However, technical matters related to these have not been disclosed in the automatic opening and closing mechanism of the prior art. In this case, it is conceivable to use a limit switch as a detection element, but an excessive load may be applied to the limit switch, depending on its set position. If the detection depends on the limit switch only, there is the possibility of causing damage to the driving motor due to the application of an overload on the driving system.

SUMMARY OF THE INVENTION

In view of the above problem of the prior art, it is an object of the present invention to provide a method and apparatus for controlling the automatic opening and closing of a window of the driver's cab of a working vehicle in which the automatic opening, closing and locking operations of the window are smoothly carried out by detecting the opening and closing operation stop positions of the window and the operation stop positions of the locking units without fail, and a high degree of safety is provided.

According to the present invention, in the method of controlling the automatic opening and closing of the window, wherein the window of the driver's cab of a working vehicle is provided between a window frame and a top wall of the driver's cab in such a manner that it can be driven vertically by a driving means for a driving cable, is moved vertically by turning on an operation switch, and is pressed by locking units against the window frame to be shut during a window closing operation; the terminal position for the downward movement of the window during a window closing operation and the terminal position for the upward movement of the window during a window opening operation are detected as a load current of the driving means for the driving cable exceeding a predetermined threshold value, whereupon the driving means for the driving cable is stopped. In the middle of window opening and closing operations, the driving means is stopped when the load current of the driving means exceeds a predetermined threshold value, except that the operation of the driving means is continued for a predetermined time after the starting of the driving means even when the load current exceeds the predetermined threshold value. After the terminal position for the downward movement of the window during a window closing operation is detected, a predetermined time lag can be provided before the starting of the locking units.

The locking stop position and the locking release position of the locking units are also detected as the load currents of the lock motors for the locking units exceeding predetermined threshold values, whereupon the lock motors are stopped. After detecting the locking release positions of the locking units, a predetermined time lag can be provided before the starting of the driving means for the driving cable.

Further, according to the present invention, in an apparatus for controlling the automatic opening and closing operations of the window which comprises guide rails formed between the window frame and the top wall of the driver's cab of a working vehicle; a window movable along the guide rails; a driving cable, connected to the window, for moving the window vertically; a driving means for the driving cable; locking units for pressing the window against the window frame to shut the window; and a controller for controlling these operations; the controller comprises a vertical movement processing unit for detecting the load current of the driving means for the driving cable to detect the terminal position for the downward movement of the window during a window closing operation and the terminal position for the upward movement of the window during a window opening operation as the load current exceeding a predetermined threshold value, and for outputting a stop signal to the driving means for the driving cable. The controller further comprises a safety circuit for stopping the operation of the driving means when the load current of the driving means for the driving cable exceeds the predetermined threshold value in the middle of a window opening or closing operation, and a cut circuit for continuing the operation of the driving means for a predetermined time after the starting of the driving means even when the load current exceeds the predetermined threshold value. In addition, the controller comprises a delay circuit for providing a predetermined time lag for the starting of the locking units after the terminal position for the downward movement of the window during a window closing operation is detected.

The controller also comprises a locking processing unit and a locking release processing unit for detecting the load current of the lock motor of the locking unit to detect the locking stop position and the locking release position of the locking unit as the load current exceeding a threshold value and for outputting a lock motor stop signal. In addition, the controller comprises a delay circuit for providing a predetermined time lag for the starting of the driving means for the driving cable after the locking release position of the locking unit is detected.

According to the above constitution, the terminal position for the downward movement of the window during a window closing operation and the terminal position for the upward movement of the window during a window opening operation can be detected as a load current applied to the driving means for the driving cable exceeding a predetermined threshold value. Therefore, the driving means can be stopped without fail and at the same time, protected from an application of an excessive load. Further, the locking stop position and the locking release position of the locking unit can be detected as the load current of the lock motor of the locking unit exceeding a predetermined threshold value. Therefore, the lock motor can be stopped without fail and at the same time, protected from an application of an excessive load. These operations make it possible to enhance the durability of the lock motor of the locking unit and the durability of the driving means for the driving cable and at the same time to smoothly carry out window opening, window closing, locking stop operation, and locking release operation. Further, the provision of a delay circuit makes it possible to carry out these operations even more smoothly. In addition, the provision of a safety circuit and a cut circuit makes it possible to prevent such inconvenience as the driving means being stopped by a high load current shortly after the starting of operation, while ensuring safety by stopping the driving means suddenly when a man or an object is caught in the window during the opening or closing operation of the window.

BRIEF DESCRIPTION OF THE DRAWINGS

FIG. 3 is a flow chart of a window opening operation;

DETAILED DESCRIPTION OF THE PREFERRED EMBODIMENT

A preferred embodiment of the present invention is described in detail with reference to FIGS. 1 to 8.

Figure 4:
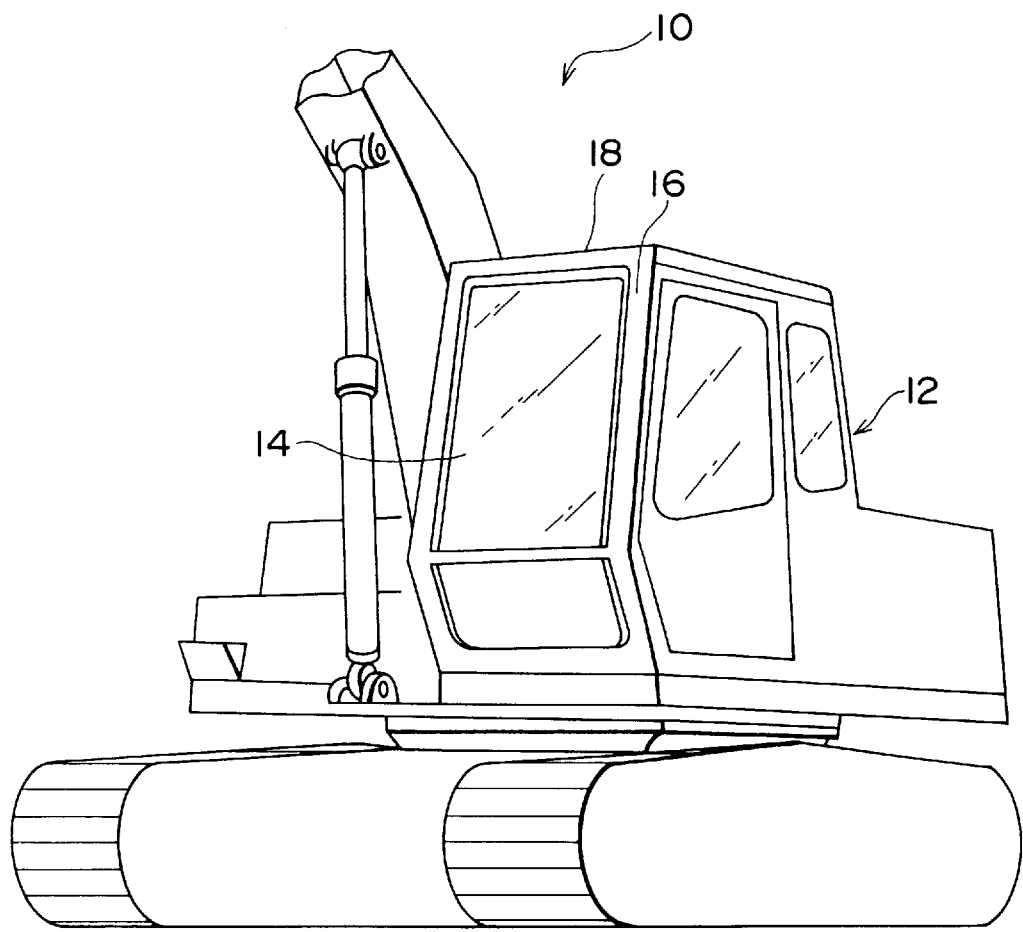
FIG. 4 is a diagram explaining a working vehicle equipped with the apparatus of the preferred embodiment for controlling the automatic opening and closing of the window.

The working vehicle equipped with the apparatus for controlling the automatic opening and closing of the window of this embodiment is a hydraulic shovel 10, as shown in FIG. 4. A window 14, installed at the front of a cabin 12 forming the driver's cab, can be automatically opened or closed.

Figure 5:
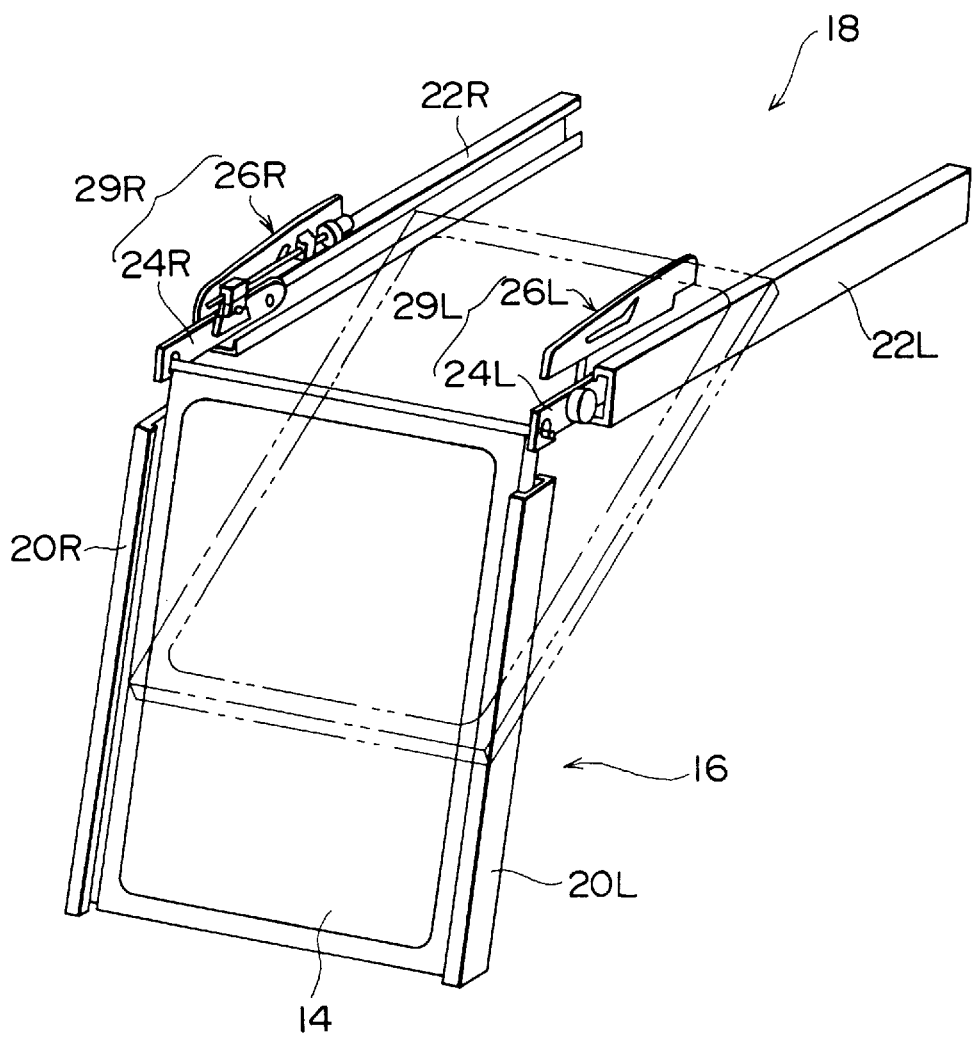
FIG. 5 is a perspective view of the apparatus for explaining window opening and closing operations.

The cabin 12, as shown in FIG. 5, has a pair of guide rails 20L and 20R on the window frame 16 and another pair of guide rails 22L and 22R on the top wall 18, along which the side edges of the window 14 are guided. Slide plates 24L and 24R, which are accommodated in the guide rails 22L and 22R on the top wall and are used to press the window 14 against the window frame 16 during a window locking operation, are installed at the left and right upper end portions of the window 14, respectively. The slide plates 24L and 24R are driven forwardly in a window locking direction by means of the pressing means 26L and 26R, which are arranged above the guide rails 22L and 22R, respectively. The locking units 29L and 29R are constituted by the slide plates 24L and 24R and the pressing means 26L and 26R, respectively.

Figure 6:
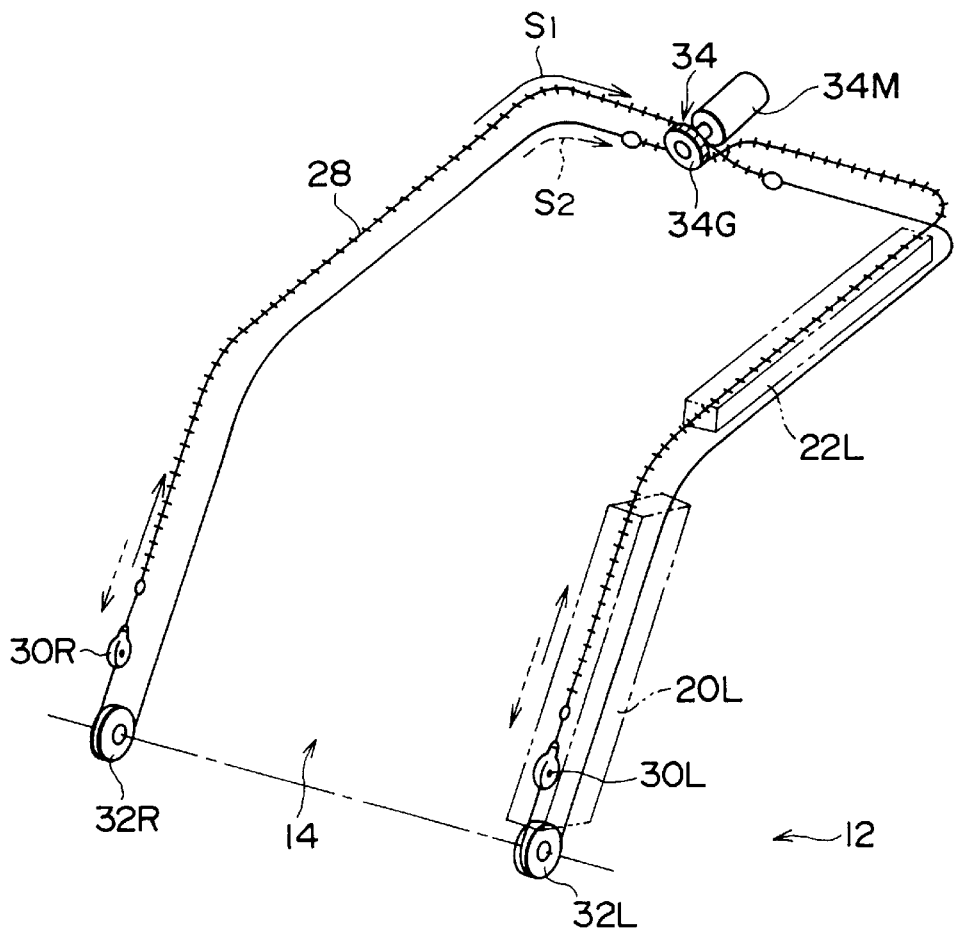
FIG. 6 is a diagram explaining the driving cable.

To move the window 14 vertically, as shown in FIG. 6, the ends of a driving cable 28 are secured to the connectors 30L and 30R, which are fixed to the left and right side portions of the window 14. Explaining from the left side, the driving cable 28, having one end secured to the connector 30L, extends along the guide rails 20L and 22L toward the rear of the cabin 12, then goes through the unshown guide rails 22R and 20R on the opposite side, extends downwardly, turns back through an idler roller 32R, which is provided on the side of the cabin 12 at a lower position of the window frame 16, and is secured to the connector 30R. The driving cable 28, whose other end is secured to the right connector 30R also turns back through an idler roller 32L and is connected to the connector 30L. A driving means 34 is provided in such a manner that it engages with the driving cable 28 to drive the driving cable 28. That is, sections of the driving cable 28 are made of a geared cable, and the driving means 34 is constituted by a gear 34G arranged to engage with the upper and lower geared sections, and a cable driving motor 34M for rotating the gear 34G. Therefore, the connectors 30L and 30R are pulled upwardly, as shown by a solid line arrow S1 in FIG. 6, by rotating the cable driving motor 34M in one direction, and are pulled downwardly, as shown by a broken line arrow S2, by rotating the cable driving motor 34M reversely. Since the connectors 30L and 30R are attached to the window 14, the opening and closing operations of the window 14 are effected by these movements of the driving cable 28.

Figure 7:
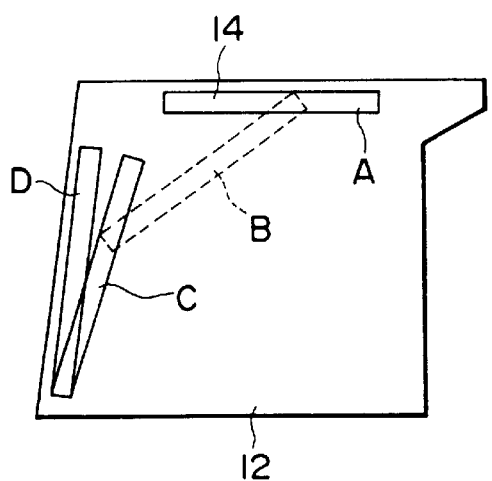
FIG. 7 is a diagram explaining window open and closed states.

The open and closed states of the window 14 are shown in FIG. 7. The open state of the window 14 is state A, in which the window 14 lies along the guide rails 22L and 22R of the top wall 18; the intermediate state of the window 14 is state B, shown by a broken line in which an upper end portion of the window 14 is located on the guide rails 22L and 22R of the top wall 18 and a lower end portion of the window 14 is located on the guide rails 20L and 20R of the window frame 16; the locking standby state is state C, in which both upper and lower portions of the window 14 are held in the guide rails 20L and 20R of the window frame 16; and the locked state is state D, in which the left and right upper end portions of the window 14 are pressed against the window frame 16 by the locking units 29L and 29R to secure the window 14.

Figure 8:
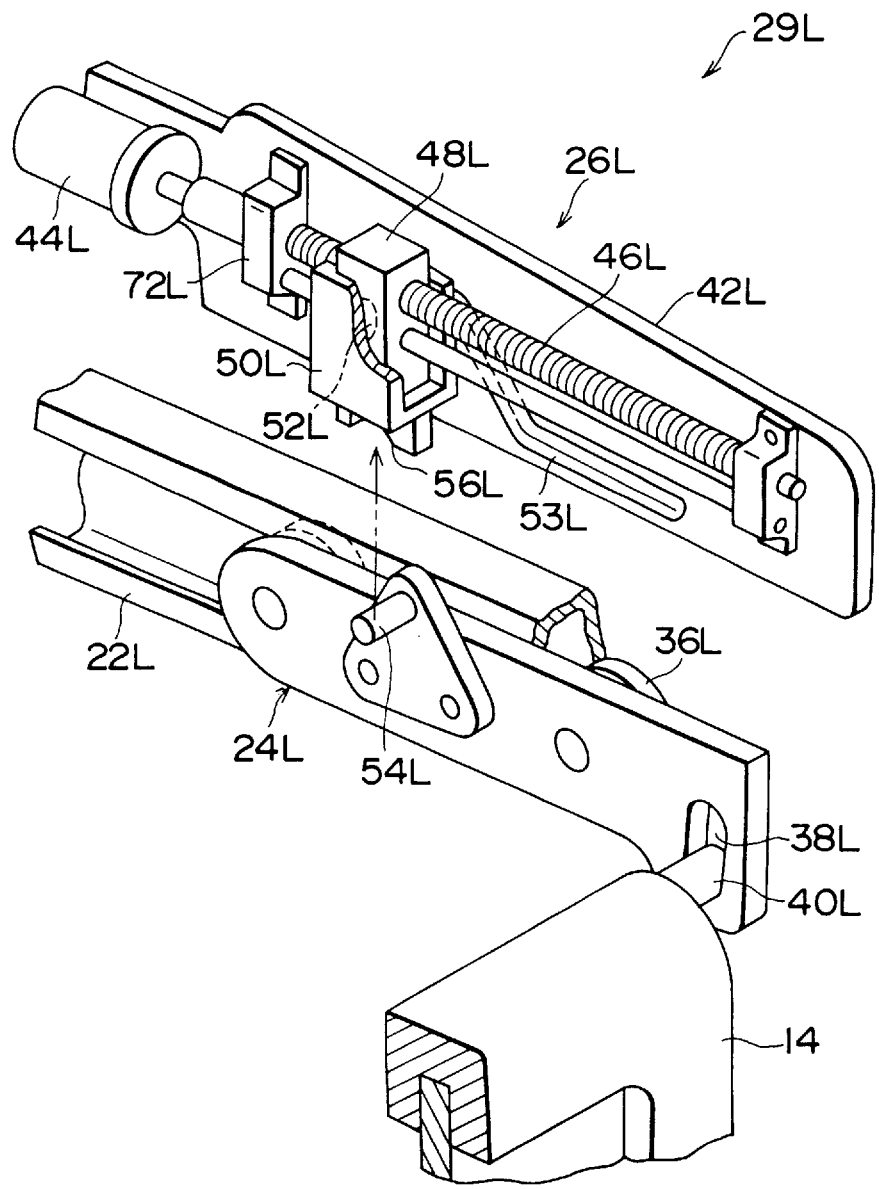
FIG. 8 is an exploded perspective view of a locking unit.

The left locking unit 29L, out of the left and right locking units 29L and 29R, is described in detail with reference to FIG. 8.

The locking unit 29L comprises the slide plate 24L and the pressing means 26L. A roller 36L is provided on one side of the slide plate 24L and is guided along the guide rail 22L. An elongated hole 38L is formed in an end portion of the slide plate 24L, and a coupling shaft 40L, projecting from an upper end of the window 14, is inserted into the hole 38L to interconnect the slide plate 24L and the window 14. Meanwhile, the pressing means 26L is arranged above the slide plate 24L and has a cam plate 42L arranged in the same plane as the slide plate 24L. On one side of the cam plate 42L, a lock motor 44L and a threaded rod 46L, rotated by the lock motor 44L, are installed. The threaded rod 46L is fitted with a movable nut 48L, and a vertically movable locking member 50L is attached to the movable nut 48L. The locking member 50L has a cam pin 52L which projects toward the direction of the thickness of the cam plate 42L and which fits in a cam slot 53L provided in the cam plate 42L. The cam slot 53L is shaped such that the locking member 50L can move downwardly on a slope in a forward direction from the limit position of its backward movement and then move forwardly horizontally. The slide plate 24L is provided with a locking pin 54L to perform a locking operation, and a locking groove 56L is formed on an under surface of the locking member 50L. When the locking member 50L moves forwardly from the limit position of its backward movement, it moves downwardly and engages with the locking pin 54L, and then the slide plate 24L is forced to move forwardly with the advance of the locking member 50L, so that an upper end portion of the window 14 is pressed against the window frame 16 to tightly close the window 14. The locking release operation of the window 14 is performed by reversing the above operation.

Figure 1:
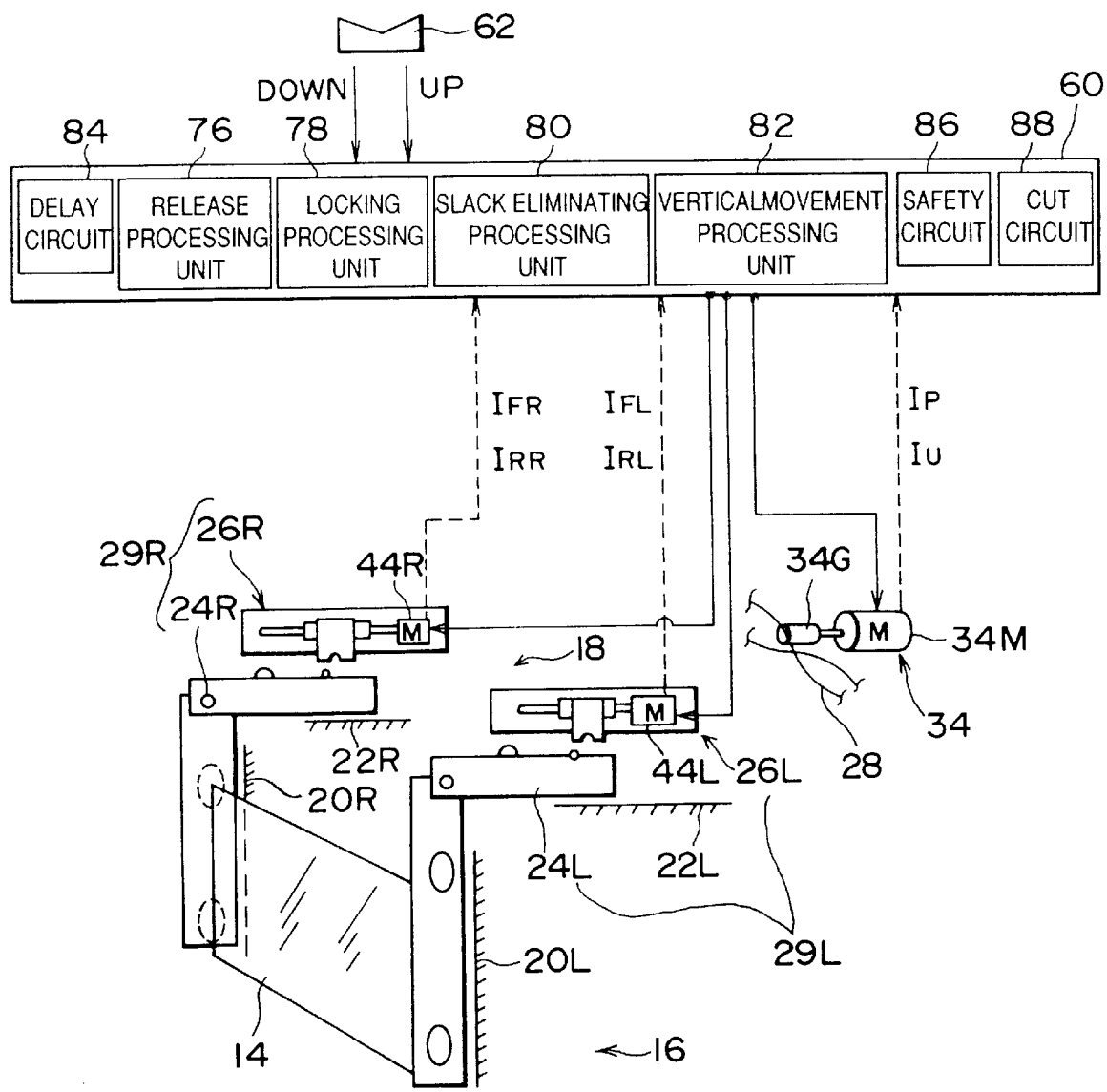
FIG. 1 is a schematic diagram of the configuration of an apparatus for controlling the automatic opening and closing of a window of the driver's cab of a working vehicle according to a preferred embodiment of the present invention.

FIG. 1 shows a control unit constituted to optimize such window opening and closing operations. The control unit has a controller 60, for controlling the opening and closing operations of the window 14, which is caused to receive an operation signal from an operation switch 62 for selecting an opening operation or a closing operation of the window 14. In response to this operation signal, the controller 60 outputs a signal, for controlling the cable driving motor 34M, to drive the driving cable 28 to the opening side or to the closing side according to the input direction of the operation switch 62.

To the controller 60 are applied: a signal for detecting that the window 14 has reached the terminal position of its downward movement in a closing operation and is in the locking standby state C, a signal indicating that the window 14 has been stored in the top wall 18 in a closing operation, a signal for detecting the locked state D in which the pressing means 26L and 26R have moved the slide plates 24L and 24R forwardly, and a signal for detecting that the locking members 50L and 50R are separated from the slide plates 24L and 24R and have reached the limit positions of their backward movements.

First, when the window 14 is moved downwardly by a closing operation and its lower end portion reaches the lower ends of the guide rails 20L and 20R on the window frame 16, the load current of the cable driving motor 34M increases, and a so-called surge current is generated since the window 14 cannot move further. The controller 60 detects that the load current of the cable driving motor 34M exceeds a predetermined value and judges that the window 14 has reached the terminal position of its downward movement and is in the locking standby state C.

Similarly, when the window 14 is moved upwardly in an opening operation and the slide plates 24L and 24R have reached the rear ends of the guide rails 22L and 22R, the load current of the cable driving motor 34M increases because the window 14 cannot move further back. The controller 60 detects that the load current of the cable driving motor 34M exceeds a predetermined value and judges that the window 14 has reached the terminal position of its upward movement and is in the open state A. That the window 14 reaches the terminal position of its upward movement can be detected when an upper end portion of the window 14 contacts an unshown fixing member arranged to face the upper end portion of the window 14.

Such signals for detecting the terminal positions of the movements of the window 14 are used by the controller 60 to surely control the locking units 29L and 29R as will be described hereinafter.

The limit positions, for the forward and backward movements of the locking members 50L and 50R of the locking units 29L and 29R, are detected by the controller 60 through a comparison of the load currents of the lock motors 44L and 44R and a reference current. That is, when the movable nuts 48L and 48R of the pressing means 26L and 26R are moved forwardly to press the window 14 against the window frame 16 in a locking operation of the window 14, contact pressure between the window frame 16 and a rubber seal around the window 14 increases, whereby the moving resistance of the movable nuts 48L and 48R rises with the result of an increase in the load currents of the lock motors 44L and 44R, thereby causing a so-called surge current. The limit positions, for the forward movements of the locking units 29L and 29R, can be judged by detecting that this load current exceeds a predetermined threshold value.

Similarly, by the locking release operation of the window 14, the movable nuts 48L and 48R of the pressing means 26L and 26R are moved backwardly and are brought into contact with the rear bearings 72L and 72R of the threaded rods 46L and 46R, or the locking members 50L and 50R are brought into contact with the edges of the cam slots 53L and 53R to prevent the backward movements of the movable nuts 48L and 48R, respectively. This prevention force increases the load currents of the lock motors 44L and 44R. The limit positions, for the backward movements of the locking units 29L and 29R, can be judged by detecting that these load currents exceed a predetermined threshold value.

The controller 60 comprises a locking release processing unit 76 and a locking processing unit 78 for the window 14, a slack eliminating processing unit 80 and a vertical movement processing unit 82 for the driving cable 28, a delay circuit 84, a safety circuit 86, and a cut circuit 88 to process the above input detection signals. The contents of these processings are described with reference to the flow charts of FIGS. 2 and 3.

Figure 2:
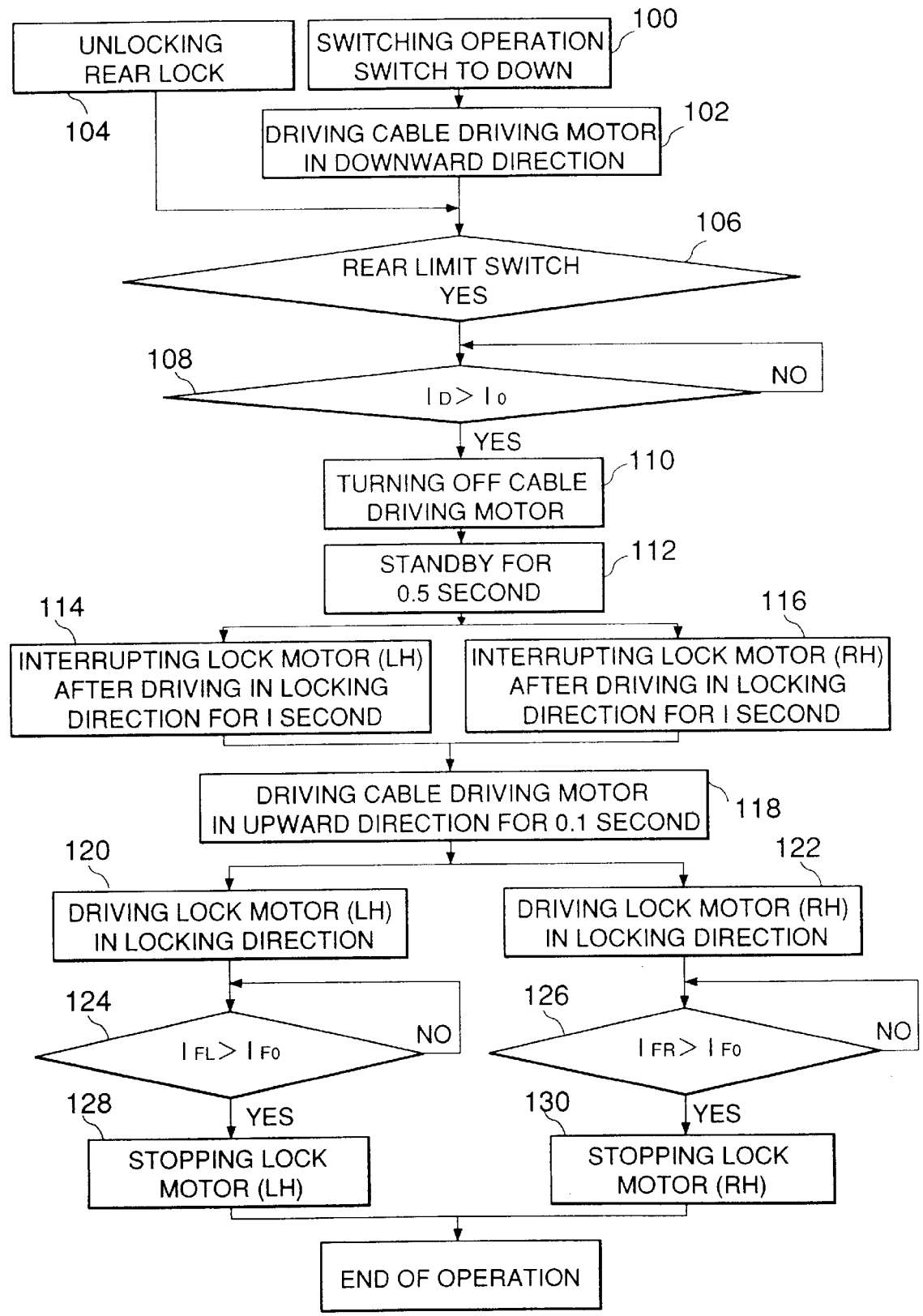
FIG. 2 is a flow chart of a window closing operation.

The closing operation of the window 14 is described with reference to FIG. 2. When the operation switch 62 is switched to DOWN (step 100), the cable driving motor 34M is activated to move the window 14 downwardly (step 102). At this point, an unshown rear locking means which holds the window 14 at the open position is released (step 104). Then, it is confirmed that the window 14 is separated from an unshown rear limit switch provided on the top wall 18 (step 106), and whether the window 14 has moved downwardly and reached the limit position of its downward movement is judged by detecting that the load current $I_D$ of the cable driving motor 34M exceeds a predetermined threshold value $I_O$ (step 108). When the load current $I_D$ does not exceed the threshold value, step 108 is repeated to continue the downward movement of the window 14. The operation state of the window 14 is changed from the open state A to the locking standby state C in FIG. 7 by such processing. When the load current $I_D$ exceeds the threshold value $I_O$, it is judged that the window 14 has reached the terminal position of its downward movement. Therefore, the vertical movement processing unit 82 of the controller 60 outputs a stop instruction to the cable driving motor 34M so as to stop the movement of the window 14 (step 110). Since the cable driving motor 34M is stopped before application of an overload, it is protected from an overload.

A predetermined time lag for the starting of the locking units 29L and 29R after the stoppage of the window 14 at the limit position of its downward movement is provided by the delay circuit 84. In this embodiment, this time lag is set to 0.5 second (step 112) to prevent the occurrence of extremely small vibrations just after the window 14 has reached the terminal position of its downward movement and to ensure engagement between the locking units 29L and 29R and the slide plates 24L and 24R, respectively.

The locking operation of the window 14 is then started by operating the left and right locking units 29L and 29R independently. That is, the locking members 50L and 50R are moved downwardly by the operation of the lock motors 44L and 44R to engage the locking grooves 56L and 56R with the locking pins 54L and 54R, respectively. During this time, the operations of the lock motors 44L and 44R are interrupted (steps 114 and 116). In this embodiment, these operations are interrupted for almost 1 second after the starting of the lock motors 44L and 44R. The slack eliminating processing unit 80 of the controller 60, which receives an interruption signal, generates an output for driving the cable driving motor 34M for the upward movement of the window 14 to remove slack in the driving cable 28 (step 118). Since the amount of slack in the cable 28 is small, the driving cable 28 is wound up for a predetermined short time. In this embodiment, the cable is wound up for 0.1 second. At this point, since the locking members 50L and 50R are held by the threaded rods 46L and 46R, locking is not undone even if the amount of winding is too large.

Subsequently, the locking processing unit 78 of the controller 60 drives the left and right lock motors 44L and 44R to advance the slide plates 24L and 24R, respectively (steps 120 and 122). The load currents $I_{FL}$ and $I_{FR}$ of the lock motors 44L and 44R are applied to the locking processing unit 78, which compares these load currents $I_{FL}$ and $I_{FR}$ with a preset threshold value $I_{FO}$ (steps 124 and 126). When it is detected that these load currents exceed the threshold value $I_{FO}$, the lock motors 44L and 44R are stopped (steps 128 and 130). That is, the left and right end portions of the window 14 are each pressed against the window frame 16, and the rubber seals provided at these portions contact each other, whereby pressing resistance gradually increases. Due to this increasing resistance, the load currents $I_{FL}$ and $I_{FR}$ of the lock motors 44L and 44R grow, thereby generating a so-called surge current. Therefore, a surge current generated when a predetermined degree of sealing is reached is taken as a threshold current $I_{FO}$, and at the time when this current is reached, the window 14 is shut without fail.

A description is subsequently given of the opening operation of the window 14 with reference to FIG. 3. When the operation switch 62 is switched to UP (step 200), the left and right locking units 29L and 29R are independently activated to drive the lock motors 44L and 44R reversely so as to move backwardly the movable nuts 48L and 48R, which are located at the limit positions of their forward movements, respectively (steps 202 and 204). Thereby, the locking members 50L and 50R move the slide plates 24L and 24R, respectively, backwardly to separate an upper end portion of the window 14 from the window frame 16. Subsequently, as the movable nuts 48L and 48R move backwardly, the cam slots 53L and 53R formed in the cam plates 42L and 42R cause the locking members 50L and 50R to move upwardly while moving backwardly, respectively. As a result, the locking members 50L and 50R are disengaged from the slide plates 24L and 24R, respectively. When the locking members 50L and 50R are brought into contact with the ends of the cam slots 53L and 53R at the limit positions of their backward movements or with the rear bearings 72L and 72R, they are stopped. Thereby, the load currents $I_{RL}$ and $I_{RR}$ of the lock motors 44L and 44R increase, thus generating a surge current. These load currents $I_{RL}$ and $I_{RR}$ are applied to the locking release processing unit 76 of the controller 60 which compares these load currents $I_{RL}$ and $I_{RR}$ with a preset threshold value $I_{RO}$ (steps 206 and 208). When it is detected that these load currents exceed the threshold current $I_{RO}$, the lock motors 44L and 44R are stopped (steps 210 and 212). This completes the locking release processing of the window 14. In this respect, since the upper end portion of the window 14 which is free from the driving cable 28 may vibrate, the window 14 is held on standby by the delay circuit 84 for about 0.5 second until the vibration state is converged (step 214). Subsequently, processing is transferred to the vertical movement processing unit 82 of the controller 60, which drives the cable driving motor 34M in a cable winding-up direction (step 216). Thereby, the window 14 is moved upwardly and stored in the top wall 18 of the cabin 12. The load current $I_U$ of the cable driving motor 34M, at the time of rotation for upward movement, is applied to the controller 60, which compares the load current $I_U$ with a threshold value $I_O$ which is a preset reference current to judge whether the load current $I_U$ exceeds the threshold value (step 218). When the load current $I_U$ does not exceed the threshold value $I_O$, step 218 is repeated to continue the upward movement of the window 14. When the load current $I_U$ exceeds the threshold value $I_O$, it can be judged that the upper end portion of the window 14 has contacted a stopper or the like and has reached the open end position, and hence, the vertical movement processing unit 82 stops the cable driving motor 34 (step 220). Since the cable driving motor 34M is stopped before application of an overload, it is protected from an overload. Thereafter, the rear locking of the window 14 is carried out (step 222) to complete the opening operation.

According to this embodiment of the present invention, the stop position of the window 14 can be determined with accuracy while application of an excessive load current to the driving motor 34M can be prevented, thereby making it possible to carry out the automatic opening and closing of the window smoothly. Particularly, since a predetermined time lag is provided for the starting of the locking units 29L and 29R after the window 14 reaches the terminal position of its downward movement, the locking members 50L and 50R can be engaged with the locking pins 54L and 54R, respectively, after vibration generated right after the window 14 reaches the terminal position of its downward movement ends completely. Therefore, a locking failure can be prevented without fail during the automatic closing operation of the window 14, and the closing operation can be automated safely. Further, the operations of the lock motors 44L and 44R are interrupted when the locking members 50L and 50R engage with the locking pins 54L and 54R, respectively. Since slack in the driving cable 28 is removed by winding up the driving cable 28 during the interruption of the operations, the driving cable 28 can be prevented from falling off of the guide rails 20L, 20R, 22L and 22R. Particularly, during the opening operation, an operation failure due to the cable play allowance can be prevented.

In this embodiment, since the left and right locking units 29L and 29R can be operated independently, the window 14 cannot be partially pressed against the window frame 16 to be shut. Particularly, when there is a difference of installation error between the locking units 29L and 29R, due to the production accuracies of the window 14 and the cabin 12 or the like, or when the locking units 29L and 29R have a production error themselves, the window 14 can be shut without fail. Therefore, there is no locking failure.

Moreover, since the limit positions of the forward movement and backward movement of the locking units 29L and 29R are detected by a surge current applied to the lock motors 44L and 44R, the contact force between the window 14 and the window frame 16 can be made constant, and an application of an excessive load current can be prevented, thereby making it possible to improve the durabilities of the lock motors 44L and 44R without a large burden on these.

In addition, the safety circuit 86 is provided in the controller 60, which detects a load current generated in the cable driving motor 34M when a man or an object is caught in the window 14 during an automatic opening or closing operation, stops the cable driving motor 34M, and gives an alarm. Therefore, safety is extremely high. Further, the cut circuit 88 is provided in the controller 60, which inhibits the operation of the safety circuit 86 for a very short time at the starting of the cable driving motor 34M or the lock motors 44L and 44R, even when a high surge current generated at the starting of the cable driving motor 34M or the starting of the lock motors 44L and 44R is detected. Therefore, an operation failure caused by ensuring safety can be prevented.

INDUSTRIAL APPLICABILITY

This invention is useful as a method and apparatus for controlling the automatic opening and closing of a window of the driver's cab of a working vehicle in which the automatic opening, closing and locking operations of the window are carried out smoothly by detecting the opening and closing stop positions of the window and the operation stop positions of the locking units without fail, and high safety is provided.

That which is claimed is:

1. A method of automatically controlling an opening and a closing of a window of a driver's cab of a working vehicle, wherein said driver's cab includes the window and a window frame, and wherein a window closing operation comprises the steps of:

actuating an operation switch to initiate a window closing operation by applying a load current to a window driving device to initiate movement of the window via the window driving device;

moving said window via the window driving device in a downward movement from an opened position, adjacent a top wall of the driver's cab, toward a lower terminal position for downward movement of said window;

continuing an operation of the window driving device for a first predetermined time after an initiation of movement of the window by the window driving device during the window closing operation, even if a load current of the window driving device exceeds a predetermined driving threshold value;

detecting the lower terminal position for the downward movement of the window during a window closing operation as a load current of the window driving device exceeding said predetermined driving threshold value at a time during the window closing operation after said first predetermined time; and stopping an operation of the window driving device upon an occurrence of a detection of the lower terminal position.

2. A method in accordance with claim 1, wherein said driver's cab further includes locking units for locking the window to the window frame, and wherein said window closing operation further comprises:

upon a stopping of the window driving device upon an occurrence of a detection of the lower terminal position, providing a predetermined time lag; and at the end of said predetermined time lag, starting locking units for pressing said window to move said window from said lower terminal position into a closed position against the window frame.

3. A method in accordance with claim 2, wherein each locking unit contains a lock motor;

wherein the step of starting locking units for pressing includes applying a load current to each lock motor; and wherein a window closing operation further comprises the steps of:

detecting a locking stop position of a locking unit as a load current of the lock motor of that locking unit exceeding a predetermined locking threshold value; and stopping an operation of the lock motor of that locking unit upon an occurrence of the load current to that lock motor exceeding the predetermined locking threshold value.

4. A method in accordance with claim 2, wherein each locking unit contains a lock motor;

wherein said window driving device includes a drive motor and a drive chain connected to said window;

wherein the step of starting locking units for pressing includes the steps of:

applying a load current to each lock motor to move said window from said lower terminal position toward said window frame;

interrupting a resulting movement of said window toward said window frame;

actuating said drive motor and said drive chain, during the resulting interruption of movement of said window toward said window frame, to remove slack in said chain; and then resuming movement of said window toward said window frame.

5. A method in accordance with claim 4, wherein a window closing operation further comprises the steps of:

detecting a locking stop position of a locking unit as a load current of the lock motor of that locking unit exceeding a predetermined locking threshold value; and stopping an operation of the lock motor of that locking unit upon an occurrence of the load current to that lock motor exceeding the predetermined locking threshold value.

6. A method in accordance with claim 2, wherein each locking unit contains a lock motor; and wherein a window opening operation comprises the steps of:

actuating an operation switch to activate the lock motors of the locking units to initiate a window opening operation by moving the window from a closed position toward a locking standby position;

detecting, for a locking unit, the locking standby position as a load current of a lock motor of that locking unit exceeding a predetermined locking release threshold value;

stopping an operation of the lock motor of that locking unit upon an occurrence of the load current to that lock motor exceeding the predetermined locking release threshold value;

at a predetermined time after the window has been moved from the closed position to the locking standby position, moving said window, by a window driving device, in an upward movement from the locking standby position toward an opened position adjacent a top wall of the driver's cab;

detecting an upper terminal position for the upward movement of the window during a window opening operation as a load current of the window driving device exceeding a predetermined upward driving threshold value; and stopping an operation of the window driving device upon an occurrence of a detection of the upper terminal position.

7. A method in accordance with claim 1, wherein the driver's cab further includes locking units for locking the window to the window frame; wherein each locking unit contains a lock motor; and wherein a window opening operation comprises the steps of:

actuating an operation switch to activate the lock motors of the locking units to initiate a window opening operation by moving the window from a closed position toward a locking standby position;

detecting, for a locking unit, the locking standby position as a load current of a lock motor of that locking unit exceeding a predetermined locking release threshold value;

stopping an operation of the lock motor of that locking unit upon an occurrence of the load current to that lock motor exceeding the predetermined locking release threshold value;

at a predetermined time after the window has been moved from the closed position to the locking standby position, moving said window, by a window driving device, in an upward movement from the locking standby position toward an opened position adjacent a top wall of the driver's cab;

detecting an upper terminal position for the upward movement of the window during a window opening operation as a load current of the window driving device exceeding a predetermined upward driving threshold value; and stopping an operation of the window driving device upon an occurrence of a detection of the upper terminal position.

8. A method of automatically controlling an opening and closing of a window of a driver's cab of a working vehicle, wherein said driver's cab includes the window, a window frame, a top wall, and locking units for locking the window to the window frame, each locking unit including a lock motor, and wherein a window opening operation comprises the steps of:

actuating an operation switch to activate the lock motors of the locking units to initiate a window opening operation by moving the window from a closed position toward a locking standby position;

detecting, for a locking unit, the locking standby position as a load current of a lock motor of that locking unit exceeding a predetermined locking release threshold value;

stopping an operation of the lock motor of that locking unit upon an occurrence of the load current to that lock motor exceeding the predetermined locking release threshold value;

at a predetermined time after the window has been moved from the closed position to the locking standby position, moving said window, via a window driving device, in an upward movement from the locking standby position toward an opened position adjacent a top wall of the driver's cab;

detecting an upper terminal position for the upward movement of the window during a window opening operation as a load current of the window driving device exceeding a predetermined driving threshold value; and stopping an operation of the window driving device upon an occurrence of a detection of the upper terminal position.

9. An apparatus comprising:

said driver's cab having a window, a window frame, and a top wall;

guide rails formed on the window frame and on the top wall, the window being movable along the guide rails;

a driving cable, connected to the window, for moving the window vertically;

a cable driving device for driving the driving cable;

locking units for pressing the window against the window frame to shut the window; and a controller; said controller detecting a load current of the cable driving device in order to detect, as a load current of the cable driving device exceeding a predetermined threshold value, either of a terminal position for a downward movement of the window during a closing operation and a terminal position for an upward movement of the window during an opening operation; said controller continuing an operation of the cable driving device for a first predetermined time after an initiation of movement of the window by the cable driving device during the window closing operation, even if a load current of the cable driving device exceeds the predetermined driving threshold value; said controller outputting a stop signal to the cable driving device upon the occurrence of a detection of a terminal position.

10. Apparatus in accordance with claim 9, wherein said controller comprises:

a safety circuit for stopping an operation of the cable driving device when the load current of the cable driving device exceeds the predetermined threshold value after said first predetermined time.

11. Apparatus in accordance with claim 9, wherein said controller comprises:

a cut circuit for continuing an operation of the cable driving device for said first predetermined time after the starting of the cable driving device even when the load current of the cable driving device exceeds the predetermined threshold value.

12. Apparatus in accordance with claim 9, wherein said controller comprises:

a vertical movement processing unit for detecting the load current of the cable driving device in order to detect the terminal position for the downward movement during a closing operation and to detect the terminal position for the upward movement of the window during a closing operation as a load current exceeding a predetermined threshold value, and for outputting a stop signal to the cable driving device.

13. Apparatus in accordance with claim 12, wherein said controller further comprises:

a safety circuit for stopping an operation of the cable driving device when the load current of the cable driving device exceeds the predetermined threshold value.

14. Apparatus in accordance with claim 13, wherein said controller further comprises:

a cut circuit for continuing an operation of the cable driving device for said first predetermined time after the starting of the cable driving device, even when the load current exceeds the predetermined threshold value, said cut circuit inhibiting operation of said safety circuit for said first predetermined time.

15. An apparatus according to claim 14, wherein the controller further comprises a delay circuit for providing a predetermined time lag for a starting of the locking units after the terminal position for the downward movement of the window during a window closing operation is detected.

16. An apparatus according to claim 15, wherein the controller further comprises a delay circuit for providing a predetermined time lag for a starting of the cable driving device after the locking release positions of the locking units are detected.

17. An apparatus according to claim 9, wherein the controller comprises a delay circuit for providing a predetermined time lag for a starting of the locking units after the terminal position for the downward movement of the window during a window closing operation is detected.

18. An apparatus according to claim 9, wherein the controller comprises a delay circuit for providing a predetermined time lag for a starting of the cable driving device after locking release positions of the locking units are detected.

19. An apparatus comprising:

said driver's cab having a window, a top wall, and a window frame;

guide rails formed on the window frame and on the top wall, the window being movable along the guide rails;

a driving cable, connected to the window, for moving the window vertically;

a cable driving device for driving the driving cable;

locking units for pressing the window against the window frame to shut the window; and a controller, wherein the controller comprises:

a locking release processing unit for detecting a locking release position of the locking units by detecting when load currents of lock motors of the locking units exceed a predetermined threshold value, and for outputting a lock motor stop signal, and a delay circuit for providing a predetermined time lag for the starting of the cable driving device after the locking release positions of the locking units are detected.

20. Apparatus in accordance with claim 19, wherein said controller further comprises:

a locking processing unit for detecting a locking stop position of the locking units by detecting when load currents of lock motors of the locking units exceed a predetermined threshold value, and for outputting a lock motor stop signal.

* * * * *

UNITED STATES PATENT AND TRADEMARK OFFICE
CERTIFICATE OF CORRECTION

PATENT NO. : 5,802,766
DATED : September 8, 1998
INVENTOR(S) : Miyazaki, et al

It is certified that error appears in the above-identified patent and that said Letters Patent is hereby corrected as shown below:

In column 12, line 28, claim 9, delete "said" and insert --a--.

In column 13, line 6, claim 12, delete "a predetermined" and insert --the predetermined--.

In column 14, line 8, claim 19, delete "said" and insert --a--.

Signed and Sealed this

Twenty-eighth Day of September, 1999

Attest:

Q. TODD DICKINSON

*Attesting Officer*  *Acting Commissioner of Patents and Trademarks*